(12) United States Patent       (10) Patent No.:     US 6,415,783 B1
Harrison                         (45) Date of Patent:     Jul. 9, 2002

(54) SOLAR ENERGY RECEIVER ASSEMBLY (75) Inventor: John Harrison, White House, Caldwell, Richmond, North Yorkshire DL11 7PU (GB)

(73) Assignee: John Harrison (GB)

( * ) Notice: Subject to any disclaimer, the term of this patent is extended or adjusted under 35 U.S.C. 154(b) by 0 days.

(21) Appl. No.: 09/786,899
(22) PCT Filed: Sep. 8, 1999
(86) PCT No.: PCT/GB99/02977
§ 371 (c)(1),
(2), (4) Date: Mar. 9, 2001
(87) PCT Pub. No.: WO00/14457
PCT Pub. Date: Mar. 16, 2000

(30) Foreign Application Priority Data

Sep. 9, 1998 (GB) ............................................. 9819668
Jun. 4, 1999 (GB) ............................................. 9913105

(51) Int. Cl.⁷ ................................................. F24J 2/10
(52) U.S. Cl. ...................... 126/683; 126/680; 126/685; 126/686; 359/365
(58) Field of Search ................................ 126/684–687, 126/698, 683, 680; 136/248, 243; 359/350, 353, 364, 365, 629, 631, 634, 619

(56) References Cited

U.S. PATENT DOCUMENTS

| 3,915,148 A | | 10/1975 | Fletcher et al. |
| 4,047,517 A | | 9/1977 | Arnberg |
| 4,210,121 A | | 7/1980 | Stark |
| 4,228,789 A | * | 10/1980 | Kay .............................. 126/686 |
| 4,337,759 A | | 7/1982 | Popovich et al. |
| 4,377,154 A | | 3/1983 | Meckler |
| 4,382,434 A | * | 5/1983 | Meckler ....................... 126/685 |
| 4,700,013 A | | 10/1987 | Soule |

FOREIGN PATENT DOCUMENTS

| EP | 0 785 400 A | 7/1997 |
| FR | 1455892 A | 1/1967 |

* cited by examiner

Primary Examiner—James C. Yeung
(74) Attorney, Agent, or Firm—Fredrikson & Byron, P.A.

(57) ABSTRACT

Solar energy receiver having two or more regions for acceptance of solar radiation, and a means for splitting the solar radiation into two or more wavelength bands. A different band of radiation is incident upon each of the regions. At least one of the regions includes a means, such as a filter, to substantially prevent radiation having a wavelength longer than that incident on the region from leaving the region.

29 Claims, 8 Drawing Sheets

SOLAR ENERGY RECEIVER ASSEMBLY

BACKGROUND OF THE INVENTION

This invention relates to solar receivers and in particular solar receivers for the collection of concentrated solar radiation.

Solar receivers of the kind to which the invention relates are typically used in conjunction with solar focusing devices such as parabolic reflectors. They convert the optical energy of the incident radiation into heat commonly for the production of electricity via gas and/or steam turbines or to drive chemical reactors.

The efficiency of solar receivers and the reactors which they supply is reduced in at least three ways. Some of the radiation which falls on the receiver is reflected out of the receiver. Some energy is lost by conduction of heat away from the receiver to the surrounding atmosphere through the walls of the receiver and some energy is wasted through radiative losses.

Reflective losses can be minimized by coating the radiated surface with a low reflective substance and shaping the receiver to cause the radiation to be reflected many times before leaving the receiver while conductive losses can be minimized by insulating the receiver.

The losses which are the most difficult to minimise are radiative losses. These are caused by the hot surfaces of the receiver, usually being the radiated surfaces, radiating energy away from the receiver in the form of electromagnetic radiation. The energy radiated away and the wavelengths at which radiative losses occur, both increase with temperature. Radiative losses are difficult to control because the solar radiation has to enter the receiver to heat the working fluid, and if radiation can enter the receiver it can also exit through the same opening.

Known solar receivers currently employ two methods to reduce radiative losses. One such known receiver uses a selective coating placed on the radiated portion of the receiver. This allows solar radiation below a certain wavelength to be absorbed by the receiver and reflect radiation having longer wavelengths. The reflected wavelengths correspond to those which result in the greatest radiative losses. This method is normally used at lower temperatures of approximately 400° C. At higher temperatures, the wavelength of the radiated radiation is shorter and increasingly overlaps with that of the incident solar radiation. Thus, using a selective coating to reduce the radiative losses at higher temperatures results in a larger proportion of the solar radiation being reflected, which reduces the theoretical maximum efficiency of the receiver.

A second method employed by other known receivers which operate at higher temperatures is to design the receivers to take advantage of receiver partitioning. In such an arrangement it is typical to use a receiver which is circular in horizontal section. The rim of the receiver having a number of circular receivers each comprising a coiled spiral tube cavity similar to that shown in U.S. Pat. No 4,449,514. The inner portion of the receiver consists of one receiver similar to that disclosed in EP 552732.

The outer receivers around the rim are heated to a lower temperature by solar radiation on the edge of the focus of the incident radiation which has a relatively low concentration ratio. The inner high temperature portion of the receiver heats the pre-heated working fluid from the centre of the focus of the incident radiation to a temperature of approximately 1300° C. Thus only the inner portion of the receiver becomes hot enough to produce significant radiative losses. However, with insolation levels at 80% of maximum values acceptable, and when heating working fluids to about 1000° C., this system still loses approximatelly 25% of incoming solar radiation via radiative losses.

By controlling the flow rate of the working fluid, receivers usually operate with the exit temperature of the working fluid being approximately constant irrespective of insolation level. Thus the temperature inside the receiver is also constant and therefore, radiative losses are approximately constant when the receiver is in use at any operating insolation level. This means that the energy lost via radiative losses at lower insolation levels is a larger proportion of the incoming radiation. When as much energy is radiated away from the receiver as falls on the receiver, the efficiency approaches zero.

These losses can be partly reduced by using high concentration ratios of solar radiation which allow use of a smaller receiver for a given power output level. However, there is an upper limit to the feasible concentration ratios, and therefore, the maximum operating temperatures at lower insolation levels.

The present invention improves receiver efficiency by reducing radiative losses at all insolation levels.

SUMMARY OF THE INVENTION

According to the present invention a solar energy receiver assembly comprises: a receiver body having at least two regions formed therein for the acceptance of solar radiation; means for splitting radiation incident upon the receiver assembly into at least two wavelength bands so that a different band of radiation is incident upon each region; and a means associated with at least one of the regions for substantially preventing wavelengths of electromagnetic radiation longer than those incident upon the region from leaving the region.

Preferably each of the regions has an associated means for substantially preventing wavelengths of electromagnetic radiation longer than those incident upon the region from leaving the region.

Preferably the or each means for substantially preventing wavelengths longer than those incident upon the region from leaving the region comprise a filter. The filter may be linear, concave or convex.

It will be appreciated that there may exist a space between the surface on which the radiation is incident and the means for preventing radiation. This may be advantageous as it reduces the concentration of radiation passing through the means for preventing radiation.

While there are several means of dispersing solar radiation in order that different wavelength bands fall on each receiver, the preferred means, described in detail below, comprise passing the radiation through a prism and/or reflecting it from a reflection grating.

The dispersion of the radiation may be carried out at the receiver assembly itself or by a primary collection means which may be a parabolic trough, dish or heliostat field.

In a preferred example, a separate receiver or group of receivers is associated with each of the regions. Alternatively, a single receiver comprising a number of receiving sections may be provided such that different wavelength bands of radiation are incident on different sections of the receiver.

It is preferred that the receiver assembly comprises at least two receivers. These receivers are designed to operate at different temperatures. In a receiver assembly having two receivers, longer wavelength radiation is directed to be incident on a low temperature receiver and shorter wavelength radiation directed to be incident on a high temperature receiver. The low temperature receiver emits radiation which is of longer wavelength than the radiation incident thereon. The greater portion of this emitted radiation is preferably of longer wavelength than the majority of the long wavelength solar radiation which is incident upon the receiver. Therefore, in preferred embodiments, a filter is placed over the opening in the low temperature receiver. This filter allows incident radiation to pass through it but does not allow the passage of radiation of longer wavelength emitted from the receiver. Thus, the radiation emitted by the receiver is retained within the receiver assembly due to the absorption or reflection of this radiation by the filter.

The high temperature receiver of such an embodiment operates in a similar way. Short wavelength solar radiation is directed to be incident upon the high temperature receiver. The higher temperature of this receiver gives rise to shorter wavelength radiation emissions than the low temperature receiver. However these emissions are of a longer wavelength than the incident radiation. Therefore, in a similar manner to the low temperature receiver, the use of a filter in conjunction with the high temperature receiver allows passage of short wavelength solar radiation but not the longer wavelength emitted radiation. Such a filter used on the high temperature receiver preferably does not transmit wavelengths which are as long as those transmitted by the low temperature receiver. Optionally, only one or not all of the receivers have an associated filter.

BRIEF DESCRIPTION OF THE DRAWINGS

A number of embodiments will now be described by way of example and with reference to the following drawings wherein.

Figures 1, 2:
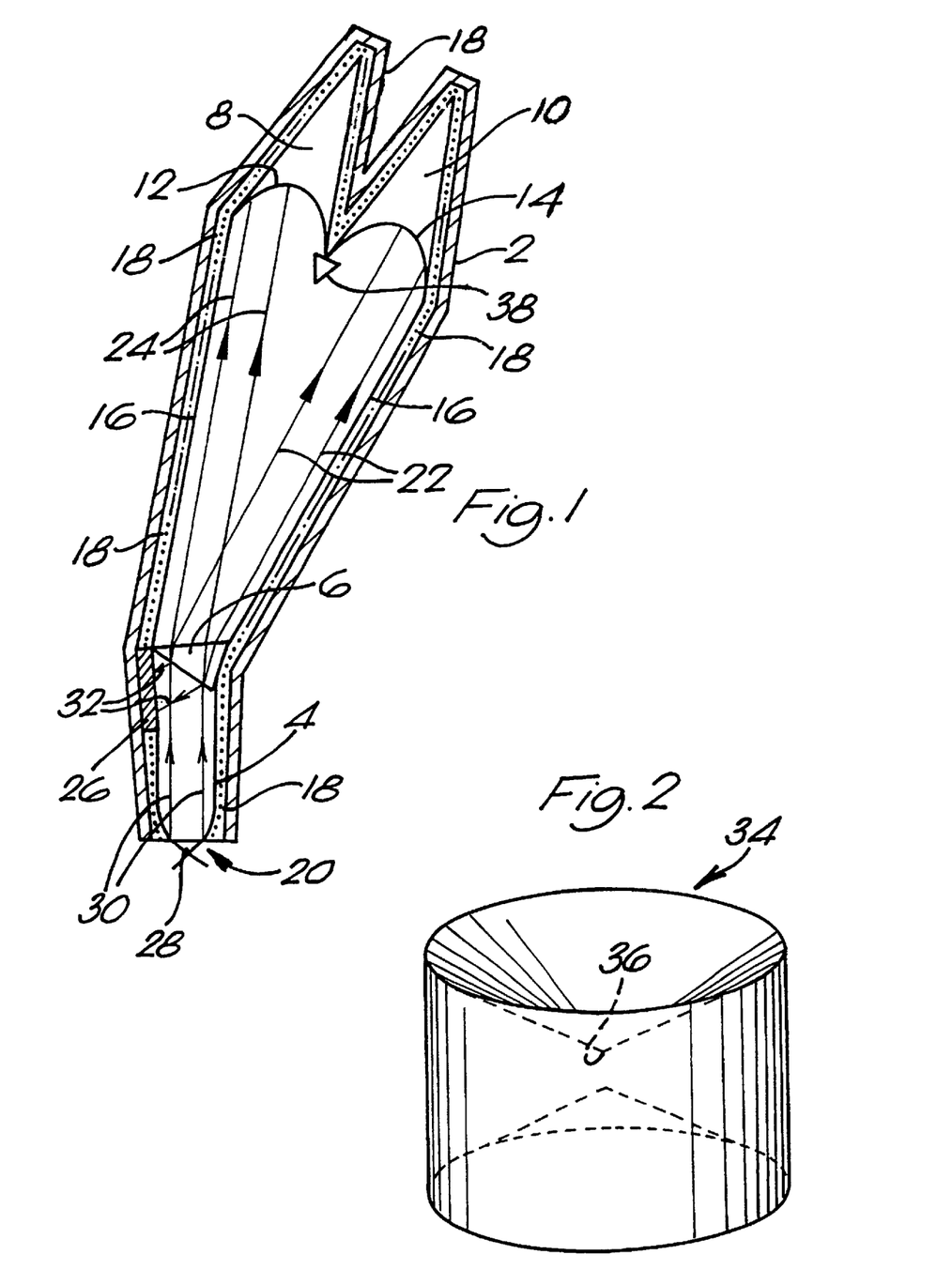
FIG. 1 is a side elevation of a section of a first embodiment of a receiver assembly according to the invention.
FIG. 2 is a perspective view of the prism used in a receiver assembly similar to that of FIG. 1.

A first embodiment of a receiver assembly according to the invention is shown in FIG. 1. It comprises an insulating housing 2 to which is fixed a cooled reflector 4 which is circular in plan, a prism 6, a low temperature receiver 8 and a high temperature receiver 10. In front of the low temperature receiver 8 is a filter 12 which transmits most of the incident solar radiation, but not the majority of the longer wavelength solar radiation emitted from the receiver 8. In front of the high temperature receiver 10 is a filter 14 which operates in a similar manner to filter 12 by preventing the transmission of solar radiation having wavelengths corresponding to the majority of emitted radiation from the receiver 10. One or other of the filters 12, 14 may be omitted. Lining the housing between the reflector and the receivers is a cooled stray radiation absorber 16. Cooling tubes 18, shown end on, carry a working fluid and are located between the housing 2 and the receivers 8, 10, the absorber 16 and reflector 4. On the bottom of the receiver assembly is aperture 20. A reflected radiation absorber 26 lies to one side of the cooled reflector.

During operation, concentrated solar radiation 28 enters the receiver through aperture 20. If the radiation is reflected from a reflector dish it is typical for the radiation to enter the receiver within a cone having an angle of approximately 90°. The concentrated solar radiation reflects from the reflector or collimator 4 which produces a substantially parallel concentrated radiation beam 30. This beam impinges on prism 6 which disperses the light by wavelength. The shorter wavelengths are bent to the greatest degree giving rise to rays 22 as shown in FIG. 1, which fall on the high temperature receiver 10. The longer wavelengths are bent to a lesser degree and produce rays 24 which fall on the low temperature receiver 8. Radiation which falls between the receivers 8, 10 is reflected into the receivers 8, 10 by a reflector 38 which is shown in FIG. 1 as having a triangular cross section.

The low temperature receiver 8 emits radiation at wavelengths which are preferably longer than those of the radiation in rays 24, which fall on the low temperature receiver 8. The low temperature filter 12 is constructed to transmit the longer wavelengths of solar radiation 24 incident upon the receiver and absorb or reflect the longer wavelengths of radiation which form the majority of the radiation which is given off as radiative emissions from the receiver 8.

The working fluid is partially heated in the low temperature receiver 8, then passed to the high temperature receiver 10. It is then heated by the shorter wavelength solar radiation of rays 22. Due to its higher temperature, the radiative emissions from this receiver 10 are at shorter wavelengths than those from the low temperature receiver 8. However, the majority of the radiation which falls on the high temperature receiver 10 is of shorter wavelength than the radiation emitted from the high temperature receiver 10. Thus filter 14 is constructed to allow passage of the solar radiation 22 incident upon this receiver but reflects back or absorbs the radiation emitted from this receiver which is at longer wavelengths. Filters 12 and 14 could be replaced or complimented with a selective coating on the surface of the receiver they cover to enhance the receiver's absorbing qualities.

Thus by only allowing solar radiation of shorter wavelengths than those emitted by the respective receiver to fall on the receiver, emitted radiation can be prevented from leaving the receiver using the filters eliminating radiative losses.

The stray radiation absorber 16, the cooled reflector 4 and the reflected radiation absorber 26 receive cold working fluid and act to heat the fluid up slightly. The stray radiation absorber 16 collects solar radiation which does not fall directly on the receiver. This may be radiation reflected internally from the prism 6 or radiation which has not been made completely parallel by the collimator 4. This radiation will then either miss the prism 6 and receivers 8, 10 or fall on the wrong receiver and may be reflected away.

The reflected radiation absorber 26 collects radiation which is reflected from the prism 6 as rays 32.

The receivers 8, 10 preferably have a conical shape to minimise reflection of solar radiation from the respective receivers by ensuring it is reflected many times within each receiver before leaving.

The reciever assembly may produce temperatures of 1300° C. in the working fluid. To attain this temperature, the radiated surface of the high temperature receiver 10 may reach temperatures of about 2000 K. and the low temperature receiver 8 may reach temperatures of about 1000 K. If the high temperature filter 14 transmits wavelengths of 800 nm and shorter, then more than 95% of the energy emitted from the surface of the receiver 10 at 2000 K., assuming it behaves as a black body, will be retained within the receiver assembly due to the filter absorbing or reflecting this longer wavelength radiation.

Solar radiation of wavelengths shorter than 800 nm are then make to fall on to the high temperature receiver 10. Wavelengths longer than 800 nm fall on the low temperature receiver 8. The vast majority of solar radiation is of wavelength shorter than 2500 nm, so the low temperature filter is preferably selected to absorb wavelengths longer than 2500 nm. At 1000 K., approximately 25% of the energy emitted from the low temperature receiver, 8 has wavelengths shorter than 2500 nm. However, the total energy emitted at 1000 K using black body theory, is less than 10% of that emitted at 2000 K. Thus 25% of radiation emitted at 1000 K is not highly significant.

Approximately half the energy carried by solar radiation between wavelengths of 850 and 950 nm is absorbed by the atmosphere. Thus the division between the high and low temperature receivers can be placed between these wavelengths. Less energy will be lost by reflector 38 for about a 1–2% increase in radiative losses at the high temperature receiver.

Due to imperfections in the primary reflector, it is not possible for the focus of the solar radiation to be a point focus as shown in FIG. 1. Instead, in practice, it will always be a plane focus. A plane focus does not produce completely parallel radiation when reflected from the collimator 4. However if the collimator 4 and receiver assembly are large in relation to the focal plane, the plane focus behaves approximately like a point focus.

It is of course possible to use more than two receivers each operating at different temperatures. The prism disperses the solar radiation almost infinitely, so any practical number of receivers can be used. In this case each receiver would operate at a temperature between the operating temperatures of the two receivers located either side of it, and receive radiation which is of shorter wavelength than it emits.

The distribution of wavelengths of solar radiation alters with the altitude of the sun in the sky. This is because the lower the sun is in the sky, the more atmosphere it must pass through. This results in a longer wavelength of solar radiation coinciding with the maximum intensity. When the sun is directly overhead, the maximum intensity is at about 480 nm. As the altitude of the sun changes the proportion of solar energy which is incident upon each receiver also changes.

For example, when the sun is on the horizon, the amount of short wavelength radiation expressed as a proportion of the total solar radiation is smaller than that of long wavelength radiation. Therefore, the rate of flow of the working fluid through each receiver in relation to the other receivers are capable of being varied in order for the working fluid to reach a constant outlet temperature. As an approximation, the lower the sun is in the sky the longer the working fluid must spend in the high temperature receivers compared with the time it spends in the low temperature receivers. Thus, to allow the working fluid to enter the receiver assembly as it exits the receiver assembly, the volume available for the working fluid in at least some to the receivers of different temperature must be varied. To control the rate of flow of the working fluid through each receiver, a device could be used to measure the intensity distribution of wavelengths within the incoming concentrated solar radiation.

The volume of the space within each receiver for the working fluid can be fixed if the high and low temperature working fluids can be kept separate. The working fluids can then flow at different rates through each receiver. The rate of flow is dependent on the proportions of the solar radiation carried at each wavelength which is determined by the altitude of the sun in the sky.

Each separate working fluid is heated in its respective receiver to its maximum operating temperature. The working fluids can then be stored in an intermediate tank at the maximum operating temperature of each receiver, the hottest receiver drawing its 'cold' working fluid from the tank which holds the 'hot' working fluid of the receiver which operates at the second to hottest temperature. In this case the same working fluid is passed through each receiver. The working fluids for each receiver can also be kept permanently separate allowing them to be made of different substances with different heat capacities, densities and melting and boiling points.

Separate working fluids require storage because they are heated at different rates. A greater proportion of the high temperature working fluid is produced when the altitude of the sun is high because a greater proportion of the solar radiation is of shorter wavelength.

Where different working fluids are used, or different means are provided for using the energy, each different working fluid or the like may be used in one or more receiver sections.

With low levels of short wavelength ultra violet radiation available when the sun is at low altitudes, it is desirable to collect as much of this radiation as possible in order to keep the time which the working fluid spends in the high temperature receiver as short as possible. Most primary solar reflecting mirrors are made from glass of high transmissivity to solar radiation abutted to a silver back. However, between 300 nm and 350 nm the reflectivity of silver is low and radiation between these wavelengths is usually lost. This radiation can be reflected if the glass abutting the silver backing is designed to reflect short wavelength radiation, below 400 nm for example.

The filters transmit the wavelengths of the incident solar radiation for the respective receiver and either absorb or reflect longer wavelengths of radiation which are emitted by the receiver. Absorbing filters have the advantage that any stray radiation which falls on the filter, having longer wavelengths than is intended to fall on that filter, will be absorbed and not lost. Although it is possible to use a reflecting filter which would reflect long wavelength solar radiation, this could result in the loss of the radiation from the receiver. Reflecting filters however have an advantage which is discussed later.

In the illustrated embodiments, the shape of the filter is chosen to be approximately conical. This has the effect of increasing the transmission of the solar radiation by ensuring that the incoming rays are reflected at least twice within the receiver before reflecting onto the respective filter. Windows of various shapes which minimise reflection for solar receivers and receiver reactors are known.

Filters, especially absorbing filters, are heated by the radiation which they absorb, and can be cooled to prevent them overheating. This cooling can be carried out by passing a fluid over the filter which is heated by the hot filter. This fluid can then be used as the working fluid for the or each receiver, or may be passed through the working fluid before it is heated in the receiver assembly. This ensures that heat energy absorbed by the filters is used to heat the working fluid and is not lost. Different cooling fluids may be associated with the different filters or windows. In this case, it is preferred that the cooling fluids are used to heat the coolest working fluid, thereby ensuring the filters or windows are as cool as possible.

The fluid used to cool each filter is preferably transparent to the wavelengths of solar radiation which are intended to fall on the receiver which the filter covers. The fluid could also be designed to absorb the wavelengths of radiation emitted by the receiver which the filter covers thereby complimenting the filter.

To keep the filter cooling fluid in contact with the filter, a second filter or window of similar shape to the first filter could be positioned to one side of the first filter, and the cooling fluid passed in between the filter and the window.

If a filter and a window combination are used then it is preferable to place the window nearest to the receiver wall and the filter further away. This is because a transparent quartz window can operate at higher temperatures than the filter and in addition, the quartz window shields the filter from the high temperatures of the receiver. The space between the receiver wall and the inner quartz window could be a vacuum or alternatively, filled with a transparent fluid. The use of a vacuum or transparent fluid may also be appropriate between the. receiver wall and filter where no window is provided. If the space is filled with fluid and the receiver wall is hotter than the maximum operating temperature of the quartz window, then heat is conducted from the receiver wall to the quartz window and transferred to the fluid which in turn cools the filter.

A reflecting filter does not absorb as much energy as an absorbing filter so will not become as hot. The working fluid used to carry the solar energy from the receiver to the turbine may have a hot temperature which could be 1000° C. above its cold temperature. The cold temperature may be 250° C. for example. The maximum operating temperature of the filters may be 400° C. The fluid used to cool the filters cannot be any cooler than 250° C. and no hotter than 400° C. Thus, the heat absorbed by the filter cooling fluid cannot increase temperature by more than 150° C. This in turn cannot raise the temperature of the working fluid by more than 150° C. Assuming the heat capacity of the working fluid is independent of temperature, and the rate of flow of the working fluid entering the receiver assembly is equal to the exit rate, no more than 15% of the total energy absorbed by the working fluid can be absorbed by the filters. Thus, radiation reflecting filters which require less cooling than absorbing filters will allow for higher maximum working fluid temperatures to be used.

Reflecting filters are also more suitable for operation when the sun is low in the sky. The maximum intensity of solar radiation occurs at longer wavelengths when the sun is low in the sky and therefore the working fluid must spend a longer time in the high temperature receiver to reach the desired exit temperature. With the working fluid spending a longer time in the high temperature receiver, a greater proportion of the energy absorbed by each unit of working fluid is radiated away. If this energy were absorbed by a filter it would require a considerable amount of cooling. This would mean a greater proportion of the total energy absorbed by the working fluid would come from the filter, and the temperature rise in the working fluid from the filter cooling fluid may well be more than 15% of the total temperature rise.

Another alternative is to place a cooled absorbing filter in front of a reflecting filter. Here stray radiation heats the cooled absorbing filter and is reclaimed by heating the working fluid, and the reflecting filter reflects back radiative emissions from the receiver. A third transparent window could be placed in front of the two filters to hold the filter cooling fluid in contact with the absorbing filter. The filter cooling fluid could also be passed between the reflecting and absorbing filters. Other configurations of windows and filters can also be used.

The prism 6 as depicted in FIG. 1 could be replaced by a circular prism 34 as shown in FIG. 2. The centre of this prism (point 36) is above the central axis of the reflector 4. The circular prism is designed to produce a disc shaped spectrum with shorter wavelengths being directed to the outside and longer wavelengths to the inside. The receivers would then form concentric circles with the hottest receivers on the outside and the coolest receivers on the inside.

To avoid white light being produced by the prism 34 in the centre of the spectrum, the receivers have to be positioned far away from the prism 34. This means that the receiver assembly has to be large. The spectrum produced will also be wider than the parallel light incident on the prism. This reduces the concentration ratio of the solar radiation thereby making it more difficult to achieve high temperatures in the working fluid.

Figure 3:
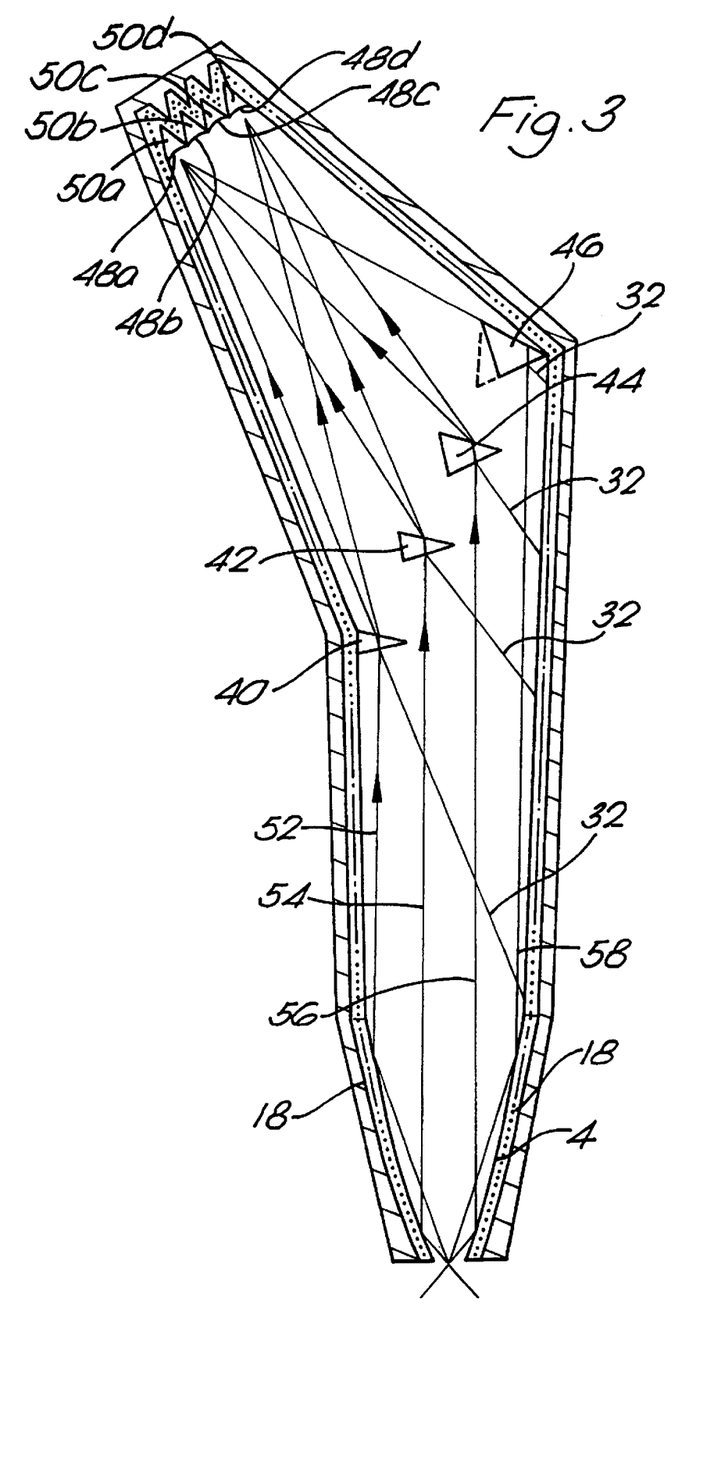
FIG. 3 is a side elevation of a second embodiment of a receiver assembly according to the invention.

The width of the dispersed spectrum can be reduced by using many prisms across the beam of parallel solar radiation, each prism being positioned so as to intercept a different part of the beam. The prisms are also positioned to place the spectrums which they produce on the same areas of the receiver assembly. An embodiment in accordance with this design is shown in FIG. 3.

In this embodiment the housing 2, the cooled reflector 4, and the stray radiation absorber remain the same. A series of prisms, 40, 42, 44 and 46 cross the housing 2 in the path of the parallel radiation. The receivers 50*a*, 50*b*, 50*c*, 50*d* and filters 48*a*, 48*b*, 48*c*, 48*d* are disposed to one side of the housing 2. Receiver 50*a* is designed to operate at the highest temperature and the shortest wavelength solar radiation is directed to be incident upon the receiver 50*a* by the prisms, 40, 42, 44 and 46.

During operation, the concentrated solar radiation falls on the reflector 4, which is cooled by the incoming cold working fluid. The working fluid then cools the radiation absorber and the receivers. The reflector 4 or collimator produces parallel rays 52, 54, 56 and 58. Ray 52 falls on prism 40 which is the weakest refractor. This dispersed radiation falls on the receivers. Ray 54 falls on prism 42 which is a slightly stronger refractor than prism 40. This dispersed radiation also falls on the receivers. Prism 40 is further away from the receivers than prism 42. However, as prism 40 is a weaker refractor than prism 42, the spectrum produced at the receivers by prism 40 is the same as that produced at the receivers by prism 42. Rays of radiation 56 and 58 fall on prisms 44 and 46. Prism 44 is a stronger refractor and is positioned closer to the receivers than prism 42, prism 46 is the strongest refractor and is placed closest to the receivers. Thus, the same width spectrum is produced by the each prism, and all the spectra overlap thereby concentrating the radiation.

The spectrum produced across the receivers is formed from the overlapping dispersion spectra created by many prisms resulting in the solar radiation concentration ratio being increased. The receivers operate in the same way as in the first embodiment.

The dispersed spectrum from each prism falls on the receivers from a different angle so the width of the spectrum perpendicular to the rays is narrower for prism 40 which falls on the receivers from a shallower angle than the width of the spectrum perpendicular to the rays from prism 42. To allow for this effect and still produce accurately overlapping spectra it may be desirable for each prism to have a slightly different refractive index.

Rays reflected from the prism are collected by the stray radiation absorber 16. The prisms are arranged so that the rays which fall on them have an angle of incidence of less than about 40°. Reflection from an air glass interface is approximately constant at 5% up to angles of incidence of around 40°. Anti-reflective coatings can be used to reduce this reflection.

Prism 46 refracts radiation to the greatest degree. When the radiation passes through the first face of the prism it is bent and may result in the radiation being reflected off the back face. To prevent this, either the back face of the prism is made to be sloping as shown by the solid line, or the whole prism is made larger as shown by the broken line.

Smaller prisms produce a higher solar radiation concentration ratio and thus allow the receivers to be nearer the prisms. To accommodate more prisms in the same size parallel radiation beam the prisms must be smaller. Many prisms producing narrow overlapping spectra will give a higher solar radiation concentration ratio than few prisms producing wider overlapping spectra.

In the embodiment shown in FIG. 3 the prisms are long and straight. They could however be replaced with circular prisms similar to those in FIG. 2. If such an alternative was used, a prism similar to 34 would be in the centre of the receiver assembly and be the strongest refractor. It would also be positioned closest to the receiver. The weaker prisms would have a more toroidal shape with a hole in the middle. For example the prism immediately below the centre one would have a hole in its centre equal to the outer diameter of the top centre prism refractor. The prism below the top one would also be a slightly weaker refractor than the top one and be positioned further from the receiver. The next prism down would have a central hole in it equal to the outer diameter of the prism above it, and be a weaker refractor and positioned further from the receiver than the one immediately above it. The overlapping spectrum produced by these annular prisms would be a disc at the top of the receiver assembly. The hottest receiver would receive the shortest wavelength radiation displaced by the prisms to the outside of the disc.

The primary reflector can be made to produce a focal ring as described in a later embodiment, with light from one side of the dish being reflected to the opposite side of the receiver. This can be used in any of the embodiments which produce a dispersed spectra on a circular area with the short wavelength radiation at the outside. The ring allows the light splitting means to place the shorter wavelength radiation to the centre of the receiver assembly, thus increasing the concentration ratio on the high temperature receiver, by reducing its radius from the centre of the receiver. The focal ring can also be produced by making the light from one side of the dish fall on the same side of the receiver, and therefore be used to produce a similar spectra.

A third embodiment eliminates the need for a reflector to give parallel radiation, by placing the prisms in the path of the concentrated solar radiation as it is converging before it reaches the focus. This embodiment is shown in FIG. 4.

Figure 4:
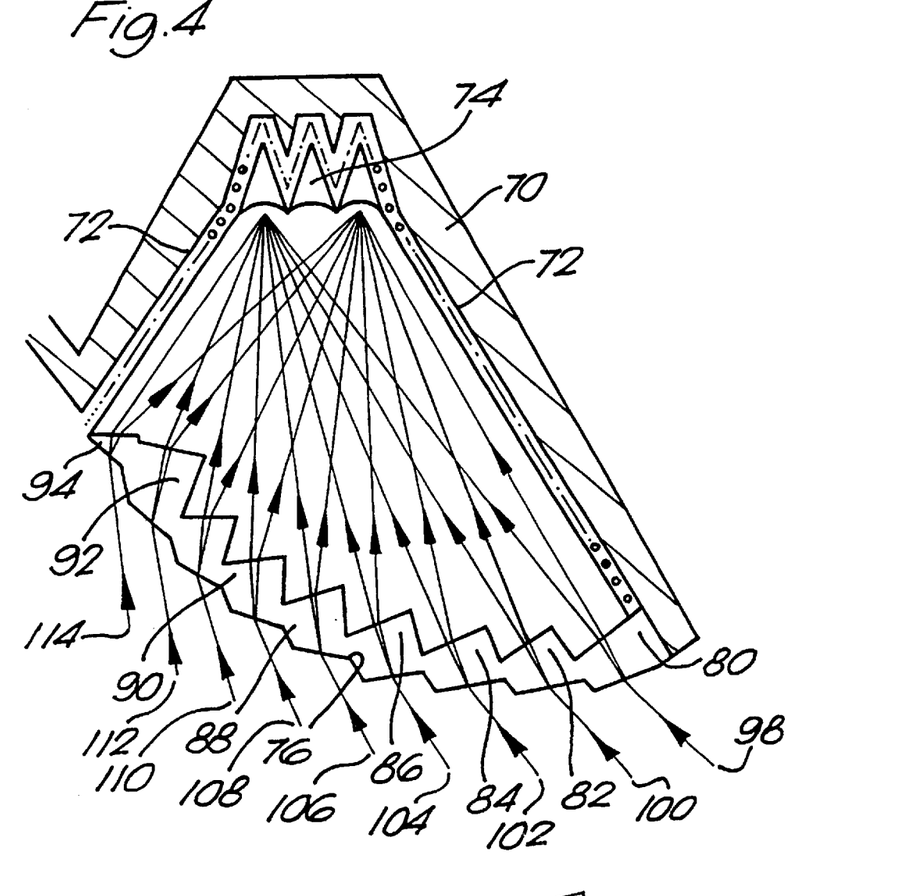
FIG. 4 is a side elevation of a section of a third embodiment of a receiver assembly according to the invention.
Figure 5:
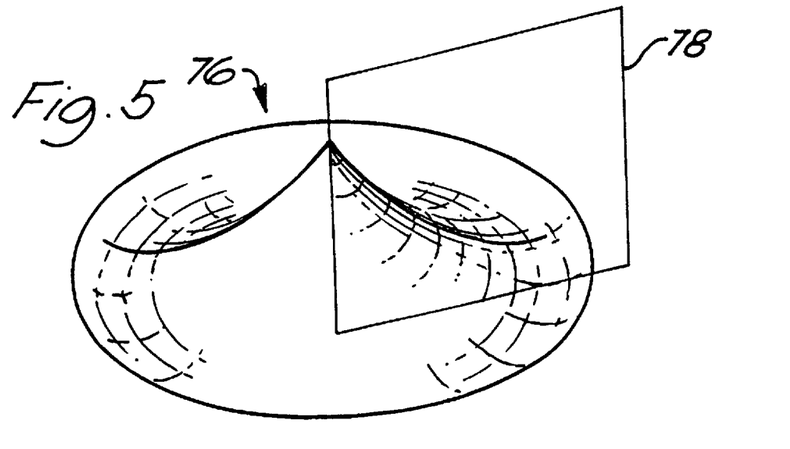
FIG. 5 is a perspective view of the compound disperser used in the receiver assembly of FIG. 4.

In the third embodiment, a section of one side of the circular receiver assembly is shown in FIG. 4. It comprises an insulated housing 70 containing a stray radiation absorber 72, and a series of receivers and filters 74. Aftached to either end of the housing is a compound disperser (CD) 76. In three dimensions the CD is shaped as illustrated in FIG. 5, with plane 78 showing the section taken in FIG. 4.

The CD is made from a material which transmits solar radiation and it has a number of circumferential grooves cut in it. The grooves are of such a shape that the CD forms a series of prisms which increase in refractive strength from the outside towards the centre. The angle of their axis changes approximately with the overall slope of the CD. The prisms formed in the CD are numbered 80, 82, 84, 86, 88, 90, 92, 94 and 96. These intercept rays of concentrated solar radiation 98, 100, 102, 104, 106, 108, 110, 112 and 114 respectively.

Ray 98 is intercepted by the weakest refracting prism 80 which is disposed furthest from the receivers. The short wavelengths of solar radiation then fall on the outer portions of the receivers and the long wavelengths on the inner portions. The remaining prisms bend and disperse the radiation they intercept to an increasing degree, to give overlapping spectra on the receivers. Taken as whole, the concentrated solar radiation prior to interception by the CD is converging. The small portion intercepted by each prism is approximately parallel and so can be dispersed to give a spectrum.

In this embodiment, reflections from the prisms are not easily intercepted. It may therefore be necessary to use an anti-reflective coating in conjunction with the CD. Anti-reflective coatings have a maximum operating temperature of about 400° C. This may mean cooling the CD with a transparent fluid and recovering any energy by passing the fluid to the cold working fluid. Alternatively, the space between the CD and the receivers and the stray radiation absorber could be left open to the atmosphere. This would place less stress on the CD by eliminating any pressure differences created at either side of it.

The prisms which go to make up the CD could be made of materials each having slightly different refractive indices. For a given amount of refraction, a high refractive index reduces the angle of incidence required between the ray and the surface of the prism. This reduces reflective losses.

In any of the above embodiments which use prisms to disperse the solar radiation, the side of the prism which is not directly irradiated by solar radiation could be coated with a reflective coating. This would send any radiation reflected internally within the prism into the stray radiation absorber. The benefits of this depend on the shape of the receiver and the direction of stray radiation. Anti-reflective coatings could also be used on the prisms in any of the above embodiments.

There are other methods which can be used to disperse solar radiation by wavelength for a receiver of this kind. These include means of making the concentrated solar radiation interfere with itself. This can be achieved by diffracting the radiation through for example a grating. Diffraction gratings have the disadvantage that some of the radiation is reflected from the grating by the lines on it and is consequently lost. In addition, the spectra are produced in fringes which complicate the layout of the receivers.

Reflection gratings offer better performance. Here successive portions of the radiation are reflected off surfaces which are slightly further from the source of radiation, causing subsequent reflected beams to be out of phase with each other and therefore interfere. The interference causes the radiation to disperse, giving rise to a spectrum.

Figure 6:
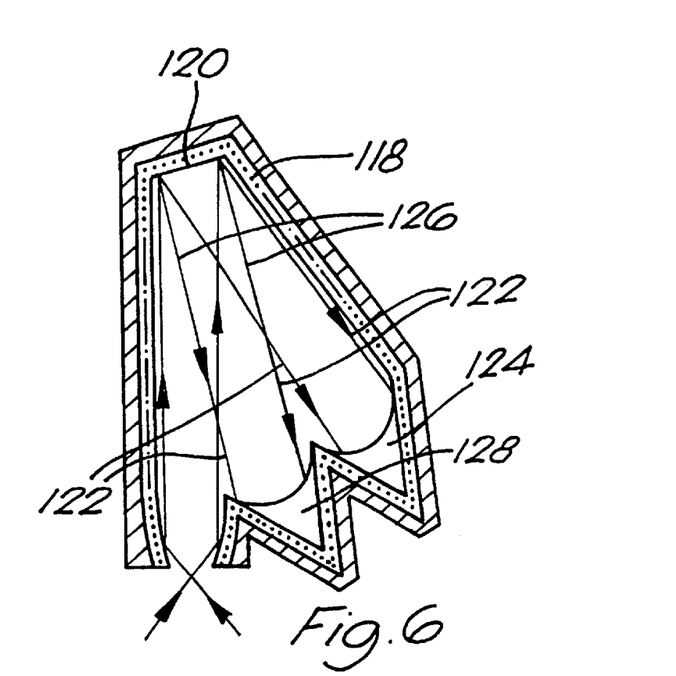
FIG. 6 is a sectional election of a receiver assembly according to a fourth embodiment of the invention.

An embodiment of a receiver assembly which uses a reflection grating as a means of dispersing the radiation is shown in FIG. 6. The lower portion of the receiver assembly, i.e., the reflector for producing parallel radiation and the stray radiation absorber is similar to that used in the first embodiment. A reflection grating 120 is placed in the path of the parallel radiation and the reflected and dispersed radiation 122 falls on the receivers 124. The longer wavelength radiation 126 falls on the colder receiver 128. Filters are associated with the receivers as discussed above.

Figure 7:
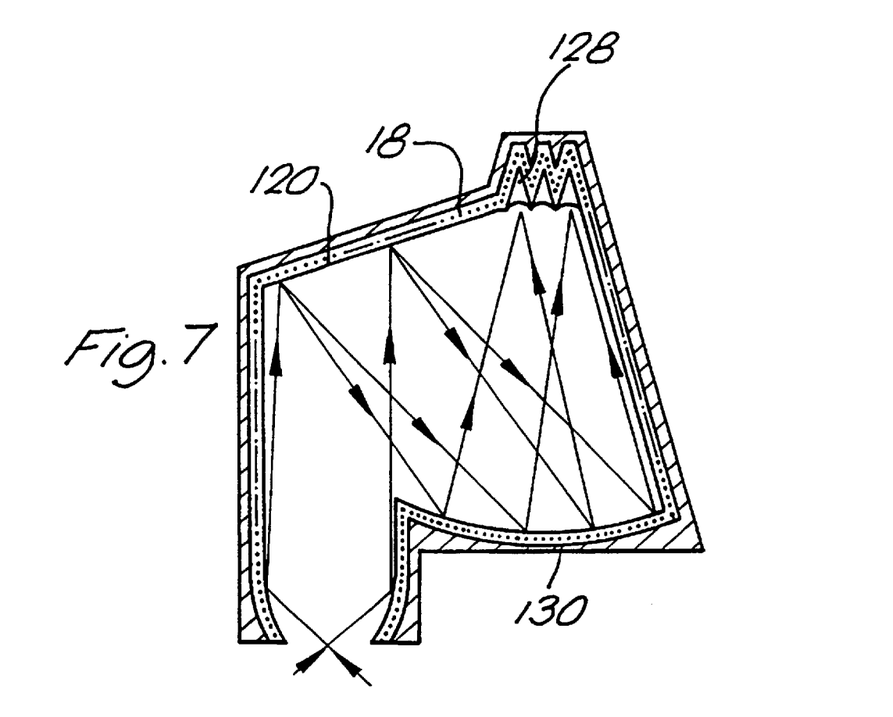
FIG. 7 is a sectional elevation of a variation of the receiver assembly of FIG. 6.

The embodiment gives rise to a spectrum which is spread over a wide area, similar to that in the first embodiment, and therefore lowers the concentration ratio and may cause difficulties in obtaining high temperatures in the working fluid. This can be overcome by placing a, preferably cooled, concentrating reflector 130 as shown in FIG. 7 in the path of the dispersed radiation between the reflection grating and the receivers. A similar cooled concentrating reflector could be used in the first embodiment.

It may be possible to design a reflection grating which can be placed in the path of the concentrated radiation from the primary reflector. The grating would then disperse the radiation by wavelength and produce a spectrum, and possibly bring the spectrum to focus in a similar manner to that in the second or third embodiments. This would keep the concentration ratio high.

Figures 8, 9:
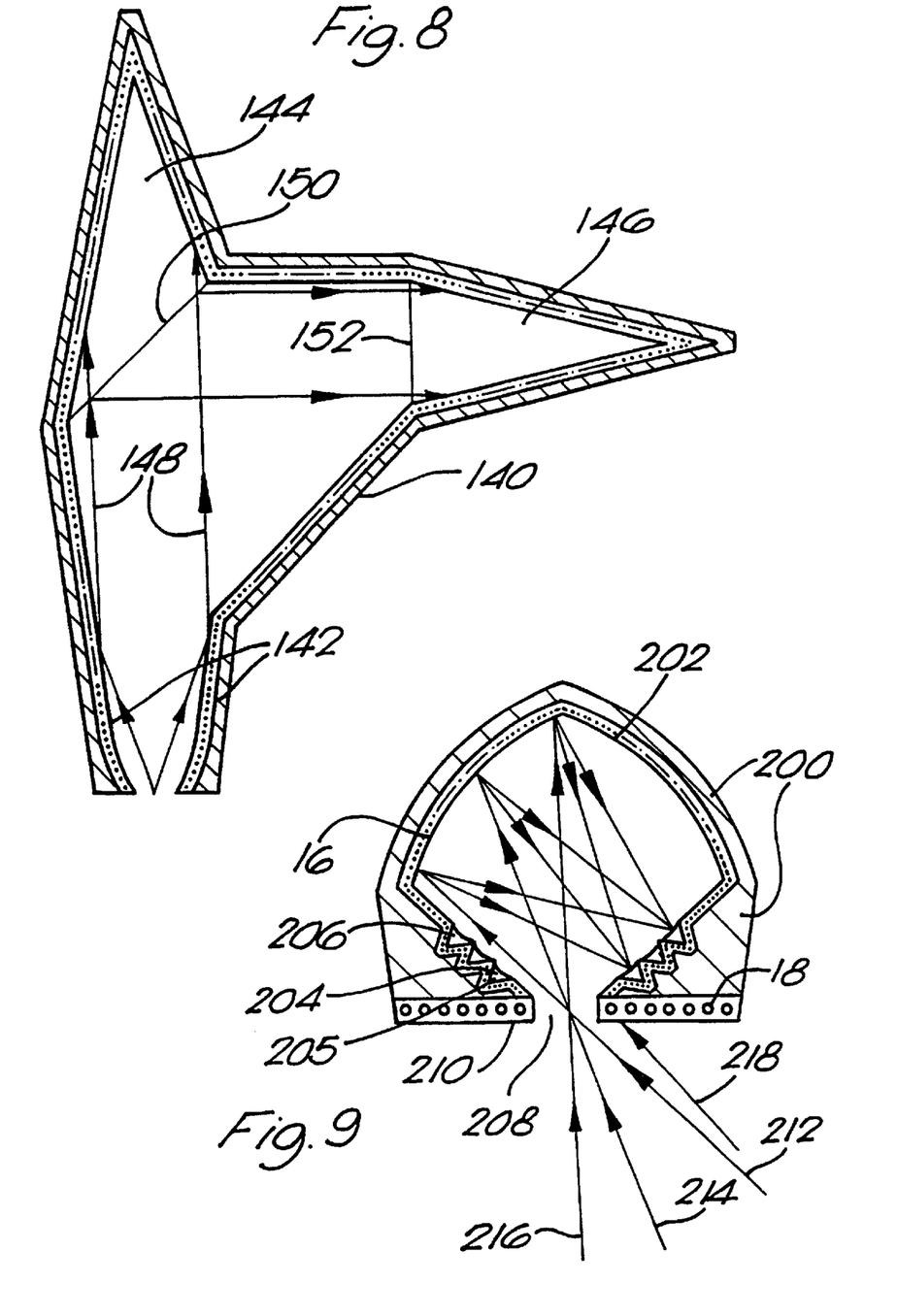
FIG. 8 is a sectional elevation of a fifth embodiment of a receiver assembly according to the invention.
FIG. 9 is a cross-sectional view of a sixth embodiment of a receiver assembly according to the invention.

A further embodiment is shown in FIG. 8. This embodiment comprises a housing 140 with a cooled collimating reflector 142. Low temperature receivers are shown at 144 and high temperature receivers at 146. In front of the low temperature receiver, at 45° to the incident beam of concentrated radiation 148 is a cold mirror 150. In front of the high temperature receiver is hot mirror 152. The mirrors 150,152 act as filters.

The cooled collimating reflector 142 produces a substantially parallel beam of concentrated solar radiation. This impinges on the cold mirror 150. This mirror reflects shorter wavelength radiation including visible and ultra violet (UV) radiation, but allows the passage of infra red (IR) radiation. The reflected visible and UV radiation then passes through the hot mirror 152. This mirror transmits UV and visible radiation, but reflects IR radiation. No IR radiation is present at this stage because it has already entered the low temperature receiver. The UV radiation and visible radiation heats the working fluid in the high temperature receiver until the fluid reaches the exit temperature.

The low temperature receiver does not operate at a high enough temperature to give rise to appreciable radiative losses which would be lost through the cold mirror. The high temperature receiver is hot enough to emit IR radiation. The hot mirror, so called because it reflects corresponding wavelengths of radiation which we feel as heat, reflects back this IR radiation into the receiver thereby minimising radiative losses.

The cold mirror which transmits IR radiation operates most successfully at 45° to the incident beam. The hot mirror is best placed normal to the beam of radiation as shown in FIG. 8.

Another embodiment uses the primary reflector, a parabolic dish, parabolic trough or heliostat field to disperse the direct solar radiation by wavelength as well as bring it to initial focus. This eliminates the need for a means of dispersing the radiation at the receiver assembly, allowing it to consist of receivers designed to operate at different temperatures with filters transmitting shorter and shorter wavelengths in front of them. The reflector may take the form of a shallow prism with a reflective back or a reflection grating.

The above embodiments can be applied equally well to a north field central receiver as well as to a dish. Surround field central receivers typically concentrate solar radiation onto the walls of a receiver with the shape of a vertical cylinder. To apply the above embodiments to a cylindrical receiver would require a number of vertical linear receiver assemblies which disperse radiation onto a number of groups of receivers comprising at least a high temperature and a low temperature receiver, around the circumference of the cylinder. The receivers would have the working fluid passed along vertical tubes. The method of dispersing the radiation would have to give rise to overlapping concentrated spectra because the dispersers are of larger diameter than the receivers and so the receivers must have a smaller area than the dispersers.

A further embodiment of a receiver assembly is shown in cross-section in FIG. 9. This embodiment makes use of a reflection grating which intercepts the diverging concentrated solar radiation after the focus. This embodiment comprises an insulated housing 200 containing a preferably cooled reflection grating 202 and a series of receivers 204 which progressively heat the working fluid to a higher temperature. The hottest receiver 206 is at the top. Aperture 208 is positioned at the focus of the concentrated solar radiation, and is surrounded by a cooled aperture surround 210.

When in operation, the filters covering the receivers are cooled by the filter cooling fluid which is used to pre-heat the incoming cold working fluid as in the previous embodiments. The pre-heated working fluid is then passed through the reflection grating and to the aperture surround. The aperture surround intercepts the stray portions of solar radiation which do not fall on the focal point of concentrated solar radiation. This radiation heats the working fluid which is passed through the aperture surround. The working fluid then passes through the receivers which heat it to its exit temperature.

The radiated surface of the aperture surround is shaped and coated to minimise the reflection of the radiation it intercepts. This is usually achieved using a black coating to absorb the radiation and a grooved surface to reflect the radiation several times onto the absorbing surface before leaving.

When cooling the receiver assembly, it is preferable to heat the working fluid which has been pre-heated by the filter cooling fluid in such a way so as to maintain the largest areas such as the reflection grating at the lowest temperatures. This minimises the radiative losses when the radiation is not prevented from leaving the receiver assembly by a filter.

As shown in FIG. 9, rays 212, 214 and 216 fall on the reflection grating 202. This disperses the rays and reflects them onto the receivers 204. The longer wavelength radiation falls onto the low temperature receiver 205 and the shorter wavelength radiation falls onto the high temperature receiver 206.

The size of the aperture is dependant on a number of factors. If the aperture is small, the focus of the solar radiation has to be small therefore, the primary reflector must be constructed accurately to produce a small focal area or point. Using a small aperture means that the radiation will fall on a small area of the refection grating from a small range of angles. The small range of angles requires the dispersion of the radiation to be accurate to produce a good spectrum a short distance from the reflection grating. When the spectrum is produced close to the grating, the width of each range of wavelengths which fall on each receiver is narrow and so the radiation concentration ratio will be high. This means that all parts of the receiver assembly may be small and so less expensive. However, to produce a small focal point, an accurate and hence expensive primary reflector is required.

If the focal point of the primary reflector is larger than the aperture used, then a portion of the focused radiation will be incident upon the aperture surround and can be used to heat the working fluid in the cooled aperture surround. This radiation is therefore not available to be dispersed and used to heat the working fluid in the receivers. Thus, the working fluid must spend a longer time in the receivers in order to reach its exit temperature. This means that the receivers need to be large to accommodate the large volume of working fluid required. Alternatively, the working fluid could be made to spend a longer time in the aperture surround in order that it reach a higher temperature. Although, this would result in increased radiative losses.

It is possible to use a cooled aperture surround or any other appropriate means which ensures that energy carried by the radiation which it intercepts is not lost with any embodiment using an entrance aperture.

If the above embodiment is used in conjunction with a primary reflector which produces a conical focus of solar radiation, then it is preferable to use a receiver assembly which is circular in plan. It is also preferable that the dispersed radiation from the reflection grating be intercepted by a surface having a shape similar to the inner surface of an inverted cone. With this arrangement,the low temperature receiver 205 is located at the bottom and the high temperature receiver 206 is located at the top. Thus, the low temperature receiver 205 has a smaller area than the high temperature receiver 206 and therefore, the concentration ratio of the radiation is lower on the high temperature receiver 206 than on the low temperature receiver 205. In order for the working fluid to reach its exit temperature, it must spend longer in the high temperature receiver 206 than in the low temperature receiver 205.

Figure 10:
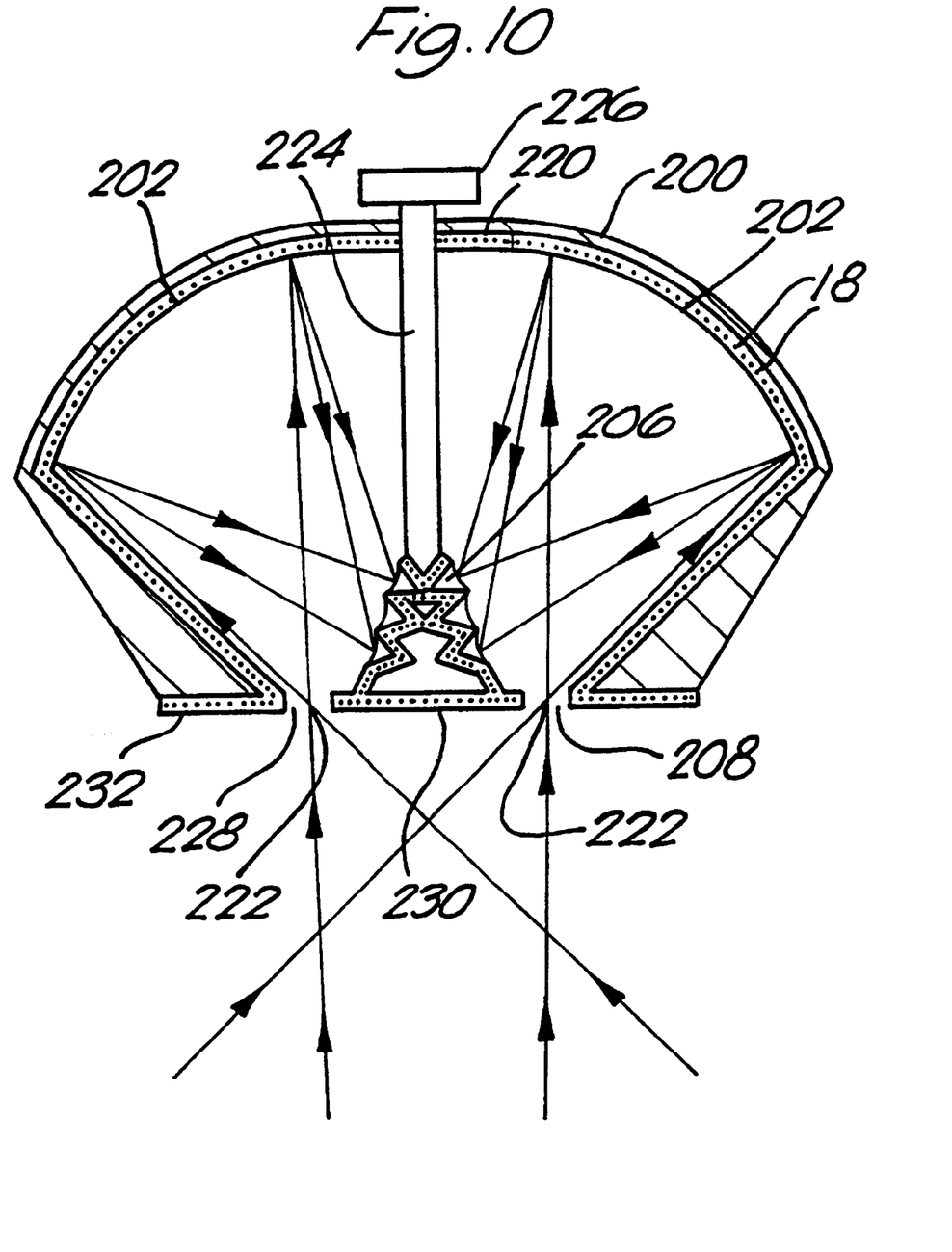
FIG. 10 is a cross-sectional view of a variation of the receiver assembly of FIG. 9.

The embodiment shown in FIG. 10 has a circular section in plan,and is numbered as in the previous embodiment. The reflection grating 202 has a stray radiation absorber 220 at the top of it and to either side. Instead of a focal point, the primary reflector used with this embodiment produces a focal ring 222. The aperture 208 is a correspondingly shaped ring and the receivers are held in a central region by mounting tube 224 which is designed not to obstruct the radiation entering the receiver. The tubes which carry the working fluid to and from the receivers and to and from the inner aperture surround in addition to the tubes which carry the filter cooling fluid to and from the filters are carried inside the mounting tube. The heat exchanger 226 which cools the filter cooling fluid and heats the working fluid can be mounted at the top of the receiver assembly.

The focal ring is produced such that the radiation 228 from one side of the primary reflector falls on the opposite side of the aperture. Any stray radiation which misses the aperture falls on the inner cooled aperture surround 230 or outer cooled aperture surround 232 and heats the working fluid which has been previously heated by the filter cooling fluid, the stray radiation absorber and the reflection grating. The majority of the concentrated radiation remains and enters the receiver assembly through the aperture and falls on the reflection grating.

The grating produces a spectrum which is directed towards the centre of the receiver assembly. The dispersed radiation now falls on the outside of a cone as shown in FIG. 10. The receivers are now positioned so that their overall shape is substantially conical with the high temperature receiver being disposed towards the top of the cone and the low temperature receiver towards the bottom. Thus, the high temperature receiver now has a smaller area which gives rise to a higher concentration ratio than the concentration ratio in the low temperature receiver.

The working fluid from the outer aperture surround is passed to the inner aperture surround through tube 224 and then to the low and high temperature receivers.

Several orders of spectra are produced by reflection gratings with radiation of a given wavelength reflecting from the grating at different angles for each order. Therefore, radiation from all but the first order of diffraction may not fall where it is intended to. This is collected by the stray radiation absorber and only a small fraction will exit the receiver assembly through the aperture.

Figure 11:
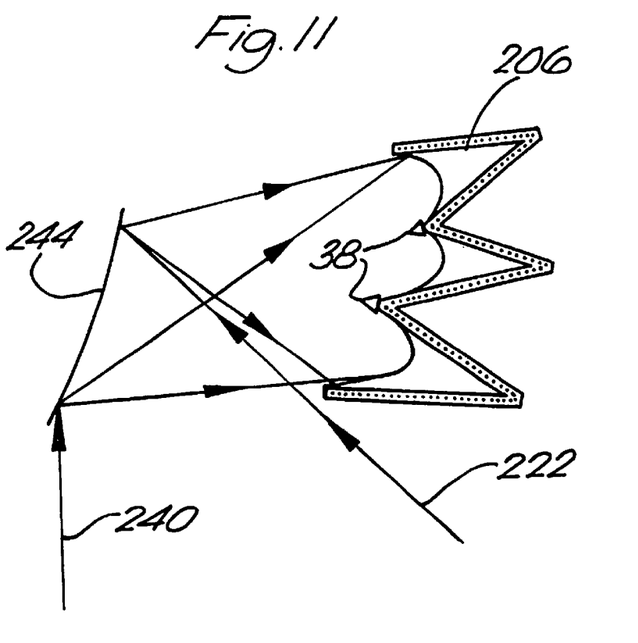
FIG. 11 is a cross-sectional view of a seventh embodiment of a receiver assembly according to the invention.

Another embodiment which uses a reflection grating and a focal ring similar to that shown in FIG. 10 is shown in FIG. 11. Only one 'side' of the receiver and focal ring is shown in this illustration. The radiation from the primary reflector or dish 222 and 240 falls on the reflection grating 244 before it reaches the focal point. In this embodiment the reflection grating 244 is curved, with radiation 222 from the outer edge of the reflector dish striking the top of the reflection grating at an angle closer to the grating normal than that from the inside of the dish 240 which falls on the bottom of the reflection grating. This type of reflection grating ensures that the dispersed radiation from each part of the grating falls on the correct receiver. To produce a pattern of dispersed radiation which falls on the correct receiver, the grating spacing varies across the grating. The spacing is closer at the top of the grating where the radiation falls on it closer to the grating normal, and wider at the bottom where the angle of incidence is further from the normal.

In this embodiment, as in the previous embodiment, the receivers are positioned to form a cone with the high temperature receiver at the top. This produces the highest concentration ratio on the high temperature receiver, and places the receivers in the best position to collect the dispersed radiation.

In this embodiment as in the other embodiments which use a reflection grating, the grating can be left exposed to the atmosphere for cooling, or heat energy absorbed by the grating can be collected by passing a fluid over or through it, and preferably reclaiming the heat energy collected.

The size of the receivers is determined by the size of the focal area of the solar image. The further the receiver is positioned from the primary reflector, the larger the solar image is and the dispersed pattern is larger for a given wavelength. Thus, the receiver has to be larger to collect all the radiation of a certain wavelength distribution. Larger receivers lead to a large reflection grating and receiver assembly. It may be possible to form a focal ring with the radiation from one side of the ring entering the receiver assembly through the dispersed radiation pattern of radiation from the opposite side of the ring and vice versa. The entrance could correspond to the part of the dispersed spectra which corresponds to approximately 1380 nm without losing any radiation through the entrance. This is because the atmosphere absorbs all radiation at this wavelength.

Figure 12:
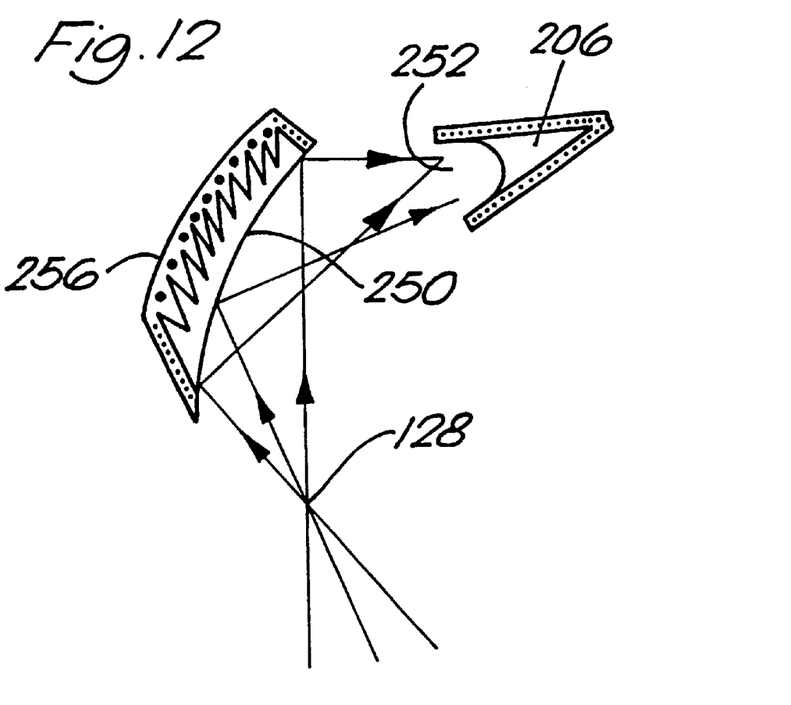
FIG. 12 is a cross-sectional view of variations of the receiver assembly of FIG. 8.

A further embodiment which uses hot and cold mirrors is shown in FIG. 12. Only one side of the receiver and focal ring is shown. A focal ring is used as in the embodiment shown in FIG. 10. The cold mirror 250 intercepts the radiation after the focus 228. It is curved to allow the interception of the radiation incident as close as possible to 45° to give the best selection of wavelength by the mirror. The curvature also produces an approximate focal point of reflected short wavelength radiation 252. The high temperature receiver 206 is positioned at or close to the focal point.

The long wavelength radiation 254 passes through the cold mirror 250 and onto the low temperature receiver 256. This receiver has a 'saw tooth' surface to minimise reflective losses and reduce the depth of the receiver required behind the cold mirror.

A saw tooth receiver can be considered as a single receiver or as a group of receivers. In the latter case, it is possible to divide the group of receivers, with different wavebands of radiation incident on different sections. Different filters may be associated with each section.

A more accurate focal point can be produced if the cold mirror is placed either before or after the focus of incoming radiation of a focal ring. The angle of incidence of the radiation on the cold mirror is not however at 45°, so some short wavelength radiation may be transmitted through it.

Figure 13:
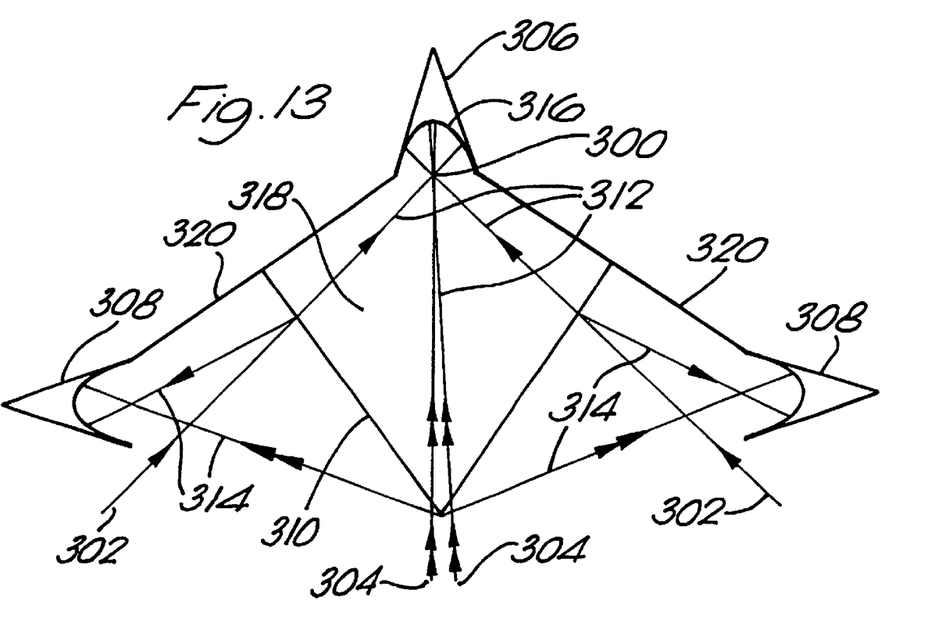
FIG. 13 is a cross-sectional view of a further embodiment of a receiver assembly according to the invention.

A further example of the present invention is shown in sectional elevation in FIG. 13. In this case the primary reflector produces a focal point 300 with rays 302 and 304 at which is placed the high temperature receiver 306. The low temperature receiver 308 forms a toroidal shape below the high temperature receiver and is shaped to receive radiation from the inside of the toroid. A filter 310 has the shape of an inverted cone and placed in the path of the incoming concentrated solar radiation before it reaches the focus.

When in operation, the radiation from the primary reflector 302 and 304 falls on filter 310. This filter transmits shorter wavelength radiation 312 and reflects longer wavelength radiation 314. The short wavelength radiation then falls at the focal point of the primary reflector on the high temperature receiver. The longer wavelength radiation falls on the low temperature receiver. The receivers and their associated filters operate in a similar way to that described in previous embodiments. Thus filter 316 in front of the high temperature receiver can be of the same properties, and even material, as the filter 310 which separates the solar radiation, because they both reflect the same wavelengths of radiation.

It is preferable to evacuate the space in the receivers between the filters and the receiver wall. This prevents excessive heating of the inner window or filter covering the entrance to the receiver. However it places atmospheric pressure on the inside of the aforementioned windows and filters. This pressure tends to push the windows and filters into the receiver, and they are of the opposite shape to resist this pressure. The pressure on the windows and filters can be reduced if the space 318 between the cone shaped filter 310 and the high temperature receiver can be evacuated, or partially evacuated. This reduces the forces on the windows in front of the high temperature receiver because there is a smaller pressure difference to either side of them. Filter 310 then resists the atmospheric pressure and is of a better shape to do so, facing outwards rather than inwards.

The space 320 between the high and low temperature receivers can be cooled as a stray radiation absorber, similar to previous embodiments.

The basic arrangement of FIG. 13 can be modified to allow the use of more than two receivers operating at different temperatures. In this case, a further filter can be provided to intercept rays 314 reflected from filter 310, but so as not to intercept incoming rays 302. The further filter would be arranged to reflect wavelengths longer than those reflected by filter 310 and shorter than those emitted by receiver 308. The reflected wavelengths would be received by a further receiver, operating at a temperature between that of receivers 306 and 308.

Figure 14:
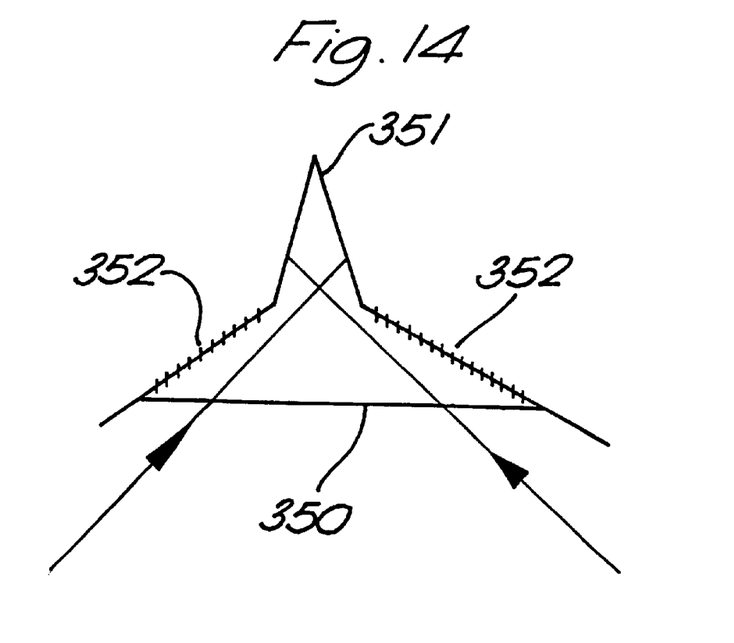
FIG. 14 is a cross-sectional view of a further embodiment of a receiver assembly.

FIG. 14 shows an arrangement of a receiver section generally similar to that shown as reference 306 in FIG. 13, but with a filter 350 provided across, but spaced from, the actual receiver 351. The actual receiver 351 is surrounded by a surface 352 which can be absorbing or reflective to absorb or reflect stray radiation and radiation emitted from the receiver. In all embodiments of the present invention, the filter or other means for preventing the escape of radiation may be spaced from the actual receiver, thereby reducing the concentration of radiation passing through the filter. The spacing between the filter and the actual receiver can be greater in the embodiments which use a reflective filter to split the radiation.

While the embodiments which have been described relate to the heating of a working fluid to enable the energy collected to be transported from the receiver, it will be appreciated that the use of such a fluid is not required. In some cases, it may not be necessary to transport the energy from the receiver, but the energy may instead be used at the receiver. For example, the energy may be used to cause phase changes, atomic migrations, chemical reactions or melting. Some of the changes or reactions may also be used for transportation of the energy. For example, the collected energy may cause a change in the phase of carbon particles in the receiver, and the changed carbon can be removed, carrying the energy.

Many of the embodiments described can be modified to include features of one or more other embodiments. Many embodiments may be modified to include additional receivers operating at different temperatures.

What is claimed is:

1. A solar energy receiver assembly comprising:
   a receiver body having at least two regions formed therein for the acceptance of solar radiation; a radiation-splitting element that splits radiation incident upon the receiver assembly into at least two wavelength bands so that a different band of radiation is incident upon each region; and a prevention element associated with at least one of the receivers to substantially prevent wavelengths of radiation longer than those incident on the associated region leaving the region.

2. A solar energy receiver assembly according to claim 1, wherein the prevention elements are associated with each region to substantially absorb or reflect radiation emitted from the associated region.

3. A solar energy receiver assembly according to claim 2, wherein the prevention element comprises a filter.

4. A solar energy receiver assembly according to claim 3, wherein the filter comprises an absorbing filter.

5. A solar energy receiver assembly according to claim 3, wherein the filter comprises a reflecting filter.

6. A solar energy receiver assembly according to claim 3, further comprising a system for cooling said filter.

7. A solar energy receiver assembly as claimed in claim 6, wherein the system for cooling said filter transfers heat energy from the filter to a working fluid.

8. A solar energy receiver assembly according to claim 1, wherein the radiation splitting element comprises a crystal.

9. A solar energy receiver assembly according to claim 8, wherein the crystal is formed in the shape of a truncated cone.

10. A solar energy receiver assembly as claimed in claim 8, wherein the crystal comprises at least one prism.

11. A solar energy receiver assembly according to claim 1, wherein the radiation splitting element comprises a diffraction grating.

12. A solar energy receiver assembly according to claim 1 further comprising a collimator disposed within the receiver body.

13. A solar energy receiver assembly according to claim 1, including a receiver or group of receivers at each of the regions.

14. A solar energy receiver assembly according to claim 1 wherein the receiver body comprises a higher temperature receiver for the acceptance of a lower wavelength band and a lower temperature receiver for the acceptance of a higher wavelength band.

15. A solar energy receiver according to claim 1, further comprising at least one working fluid within the receiver body for absorbing and transporting energy from the receiver assembly.

16. A solar energy receiver assembly according to claim 14, wherein at least one working fluid is heated by energy transmitted from the low temperature receiver then subsequently heated by energy transmitted from the high temperature receiver.

17. A solar energy receiver assembly according to claim 14, wherein the lower wavelength band comprises radiation having waving wavelengths lower than approximately 800 nm and the higher wavelength band comprises radiation having wavelengths higher than approximately 800 nm.

18. A solar energy receiver assembly according to claim 1, further comprising a focusing element disposed within the receiver body to focus the radiation into the regions.

19. A solar energy receiver assembly according to claim 1, further comprising a reflecting element disposed within the receiver body to increase the optical path of the radiation within said receiver body.

20. A solar energy receiver assembly according to claim 1, further comprising a partially reflective filter for the purpose of splitting the incident radiation into two or more optical paths.

21. A solar energy receiver assembly according to claim 1 wherein the radiation splitting element is disposed within the receiver body.

22. A solar energy receiver assembly according to claim 1, wherein the means for splitting radiation is disposed external to the receiver body.

23. A solar energy receiver assembly according to claim 1, wherein the receiver assembly comprises one working fluid.

24. A solar energy receiver assembly according to claim 1, wherein the receiver assembly comprises two or more different working fluids or systems for utilising heat.

25. A solar energy receiver assembly according to claim 1, in which the prevention element is associated with each region to substantially absorb and reflect radiation emitted from the associated region.

26. A solar energy receiver assembly comprising:
   a receiver body having at least two regions formed therein for the acceptance of solar radiation; and
   an optical element that splits radiation incident upon the receiver assembly into at least two wavelength bands so that a different band of radiation is incident upon each region, the optical element being associated with each of the receivers to substantially prevent wavelengths of radiation longer than those incident on the associated region leaving the region.

27. A solar energy receiver according to claim 26 wherein the optical element includes a radiation splitting element and a prevention element, the radiation splitting element splitting radiation incident upon the receiver assembly into at least two wavelength bands so that a different band of radiation is incident upon each region, and the prevention element being associated with each of the receivers to substantially prevent wavelengths of radiation longer than those incident on the associated region leaving the region.

28. A solar energy receiver assembly comprising:
   a receiver body having at least two regions formed therein for the acceptance of solar radiation;
   a radiation-splitting element that splits radiation incident upon the receiver assembly into at least two wavelength bands so that a different band of radiation is incident upon each region;
   a prevention element associated with each of the receivers to substantially prevent wavelengths of radiation longer than those incident on the associated region leaving the region;
   at least one working fluid within the receiver body for absorbing and transporting energy from the receiver assembly, wherein at least one working fluid is heated by energy transmitted from a low temperature receiver then subsequently heated by energy transmitted from a high temperature receiver;
   a focusing element disposed within the receiver body to focus the radiation into the regions;
   a reflecting element disposed within the receiver body to increase the optical path of the radiation within said receiver body; and
   a partially reflective filter for the purpose of splitting the incident radiation into two or more optical paths.

29. A receiver body having at least two regions formed therein for the acceptance of solar radiation; means for splitting radiation incident upon the receiver assembly into at least two wavelength bands so that a different band of radiation is incident upon each region; and a means associated with at least one of the receivers to substantially prevent wavelengths of radiation longer than those incident on the associated region leaving the region.

* * * * *